United States Patent
Hawkins et al.

(10) Patent No.: US 10,788,327 B2
(45) Date of Patent: Sep. 29, 2020

(54) DETERMINING A POSITION OF A VEHICLE ON A TRACK

(71) Applicants: Sony Corporation, Tokyo (JP); Sony Europe B.V., Weybridge (GB)

(72) Inventors: Paul Hawkins, Shawford (GB); Luke Dodd, Winchester (GB)

(73) Assignees: Sony Corporation, Tokyo (JP); Sony Europe B.V., Weybridge (GB)

( * ) Notice: Subject to any disclaimer, the term of this patent is extended or adjusted under 35 U.S.C. 154(b) by 328 days.

(21) Appl. No.: 15/808,086

(22) Filed: Nov. 9, 2017

(65) Prior Publication Data

US 2018/0216943 A1 Aug. 2, 2018

(30) Foreign Application Priority Data

Jan. 31, 2017 (GB) .................................. 1701586.8

(51) Int. Cl.
| | |
|---|---|
| *G01C 21/32* | (2006.01) |
| *G01C 21/16* | (2006.01) |
| *G06T 7/11* | (2017.01) |
| *G06T 7/70* | (2017.01) |
| *G06K 9/00* | (2006.01) |

(Continued)

(52) U.S. Cl.
CPC ............. *G01C 21/32* (2013.01); *G01C 21/16* (2013.01); *G05D 1/0246* (2013.01); *G05D 1/0274* (2013.01); *G06K 9/00791* (2013.01); *G06T 7/11* (2017.01); *G06T 7/70* (2017.01); *G06K 9/6202* (2013.01)

(58) Field of Classification Search
CPC .......... G01C 21/32; G01C 21/16; G06T 7/11; G06T 7/70; G05D 1/0246; G05D 1/0274; G06K 9/00791; G06K 9/6202
USPC ....................................................... 701/450
See application file for complete search history.

(56) References Cited

U.S. PATENT DOCUMENTS

| | | | | |
|---|---|---|---|---|
| 6,065,406 | A | * | 5/2000 | Katzer .................. A63H 19/24 105/1.4 |
| 6,170,402 | B1 | * | 1/2001 | Rude ....................... A63G 7/00 104/53 |

(Continued)

FOREIGN PATENT DOCUMENTS

| | | |
|---|---|---|
| EP | 2 019 288 A1 | 1/2009 |
| EP | 3 018 448 A1 | 5/2016 |
| WO | WO 01/33530 A1 | 5/2001 |

*Primary Examiner* — Tuan C To
(74) *Attorney, Agent, or Firm* — Oblon, McClelland, Maier & Neustadt, L.L.P.

(57) ABSTRACT

An apparatus includes input circuitry and processor circuitry. The input circuitry is configured to receive, from a camera attached to a vehicle, a plurality of images as the vehicle travels along the track. The processor circuitry is configured to, for at least one of the plurality of captured images, perform feature recognition on the image, to assign an indicator to at least one recognised feature in the image indicative of a suitability of the at least one recognised feature for adjusting the position of the vehicle on the map. The processor circuitry is configured to, for each recognised feature in the image with the indicator, adjust the position of the vehicle on the map when the recognised feature is represented in the map of the track, and add a representation of the recognised feature to the map when the recognised feature is not represented in the map of the track.

17 Claims, 9 Drawing Sheets

(51) Int. Cl.
 *G05D 1/02* (2020.01)
 *G06K 9/62* (2006.01)

(56) References Cited

U.S. PATENT DOCUMENTS

| | | | | |
|---|---|---|---|---|
| 6,631,322 | B1* | 10/2003 | Arthur | B61L 27/0027 340/991 |
| 7,831,389 | B2* | 11/2010 | Yamada | G01C 21/30 701/412 |
| 9,086,290 | B2* | 7/2015 | Obara | G01C 21/32 |
| 9,103,679 | B2* | 8/2015 | Habib | G01C 21/3688 |
| 9,862,396 | B2* | 1/2018 | Nandedkar | B61L 25/021 |
| 9,965,699 | B2* | 5/2018 | Sorstedt | B60R 1/00 |
| 2008/0077322 | A1 | 3/2008 | Sumizawa | |
| 2009/0114114 | A1* | 5/2009 | Rose | A63G 7/00 104/53 |
| 2010/0061591 | A1* | 3/2010 | Okada | G01C 7/04 382/103 |
| 2010/0256836 | A1* | 10/2010 | Mudalige | G08G 1/163 701/2 |
| 2011/0242311 | A1* | 10/2011 | Miyajima | G01C 21/3602 348/116 |
| 2011/0246027 | A1* | 10/2011 | Miyajima | G01C 21/3647 701/41 |
| 2016/0161259 | A1* | 6/2016 | Harrison | G01S 19/48 701/409 |
| 2017/0016731 | A1* | 1/2017 | Koshiba | G01C 21/20 |

\* cited by examiner ated as prior art against the present disclosure.
DETERMINING A POSITION OF A VEHICLE ON A TRACK

CROSS REFERENCE TO RELATED APPLICATIONS

The present application claims priority to United Kingdom Application GB1701586.8 filed on 31 Jan. 2017, the contents of which being incorporated herein by reference in its entirety.

BACKGROUND

Field of the Disclosure

The present disclosure relates to a determining a position of a vehicle on a track.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

When a vehicle (such as a racing car or racing motorcycle) is positioned on a track (such as a racing track), it is desirable to be able to determine the position of that vehicle on the track at any given time. This enables, for example, the progress of the vehicle during a race to be tracked.

There are several known methods for determining the position of a vehicle on a track. In one example, the vehicle can be tracked using a global navigation satellite system (GNSS). Such systems, however, typically are only able to determine the vehicle position to within a few metres, meaning that a more exact position of the vehicle cannot be determined. In another example, timing loops can be integrated into the track at certain positions on the track. These timing loops detect when the vehicle passes them, and thus an accurate time at which the vehicle is positioned at the position of each timing loop on the track can be determined. However, no such accurate information regarding the vehicle position can be determined when the vehicle is travelling between timing loops. In another example, other information such as the wheel speed of a vehicle can be used. However, this is also often not particularly accurate, due, for example, to the fact that, as a vehicle slides or skids on the track or when the wheel is subject to wheel spin, the speed of the wheel does not necessarily reflect the speed of the vehicle.

There is therefore a desire to be able to determine the position of a vehicle on a track more accurately.

SUMMARY

The present technique provides an apparatus for determining a position of a vehicle on a track, the apparatus comprising: a storage medium operable to store a map of the track comprising a representation of one or more features of the track and to store a position of the vehicle on the map; input circuitry operable to receive, from a camera attached to the vehicle, a plurality of images captured by the camera as the vehicle travels along the track; and processor circuitry operable, for at least one of the plurality of captured images: to perform feature recognition on the image, to assign an indicator to at least one recognised feature in the image indicative of the suitability of the at least one recognised feature for adjusting the position of the vehicle on the map based on the recognised feature, and for each recognised feature in the image with an indicator which indicates that the recognised feature is suitable for adjusting the position of the vehicle on the map based on the recognised feature: when the recognised feature is already represented in the map of the track, to adjust the position of the vehicle on the map based on the position of the representation of the recognised feature in the map, and when the recognised feature is not already represented in the map of the track, to add a representation of the recognised feature to the map.

The present technique also provides a method of determining a position of a vehicle on a track, the method comprising: storing a map of the track comprising a representation of one or more features of the track and storing a position of the vehicle on the map; receiving, from a camera attached to the vehicle, a plurality of images captured by the camera as the vehicle travels along the track; and for at least one of the plurality of captured images: performing feature recognition on the image, assigning an indicator to at least one recognised feature in the image indicative of the suitability of the recognised feature for adjusting the position of the vehicle on the map based on the at least one recognised feature, and for each recognised feature in the image with an indicator which indicates that the recognised feature is suitable for adjusting the position of the vehicle on the map based on the recognised feature: when the recognised feature is already represented in the map of the track, adjusting the position of the vehicle on the map based on the position of the representation of the recognised feature in the map, and when the recognised feature is not already represented in the map of the track, adding a representation of the recognised feature to the map.

The present technique also provides a computer program product comprising a storage medium storing a computer program configured to control a computer to perform the above-mentioned method.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
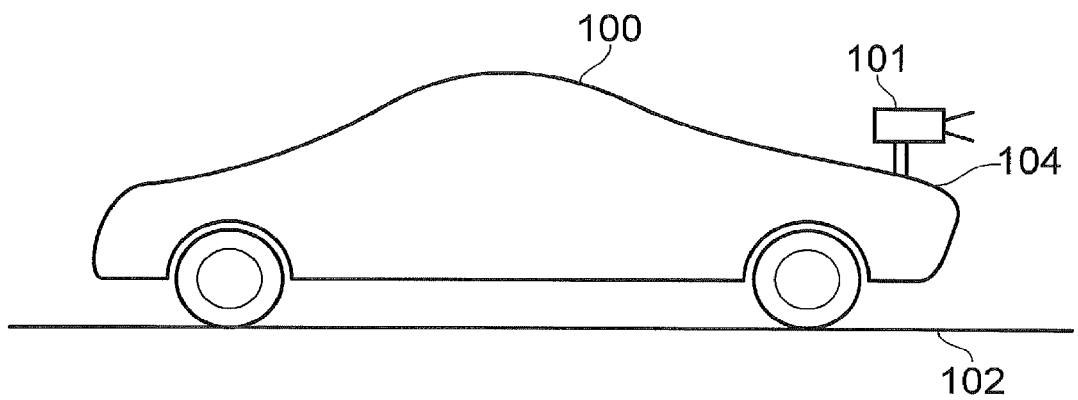
FIG. 1 schematically illustrates a vehicle for use with an embodiment of the present disclosure.

Referring now to the drawings, wherein like reference numerals designate identical or corresponding parts throughout the several views.

FIG. 1 schematically illustrates a vehicle 100 (in this case, a racing car such as a NASCAR® racing car) for use with an embodiment of the present disclosure. The vehicle is travelling along a track 102 (a track comprising, amongst other features, a tarmac surface arranged in a circuit so that the vehicle may continuously travel around the track) and has a camera 101 attached to it. The camera 101 is mounted on the hood (bonnet) 104 of the vehicle and is positioned such that its field of view comprises objects in front of the vehicle 100 as the vehicle travels along the track.

Figure 2B:
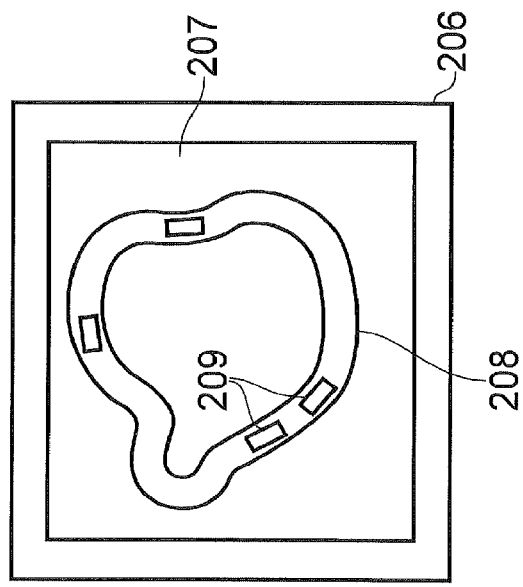
FIGS. 2A and 2B schematically show an apparatus according to an embodiment of the present disclosure and a display device, respectively.
Figure 2A:
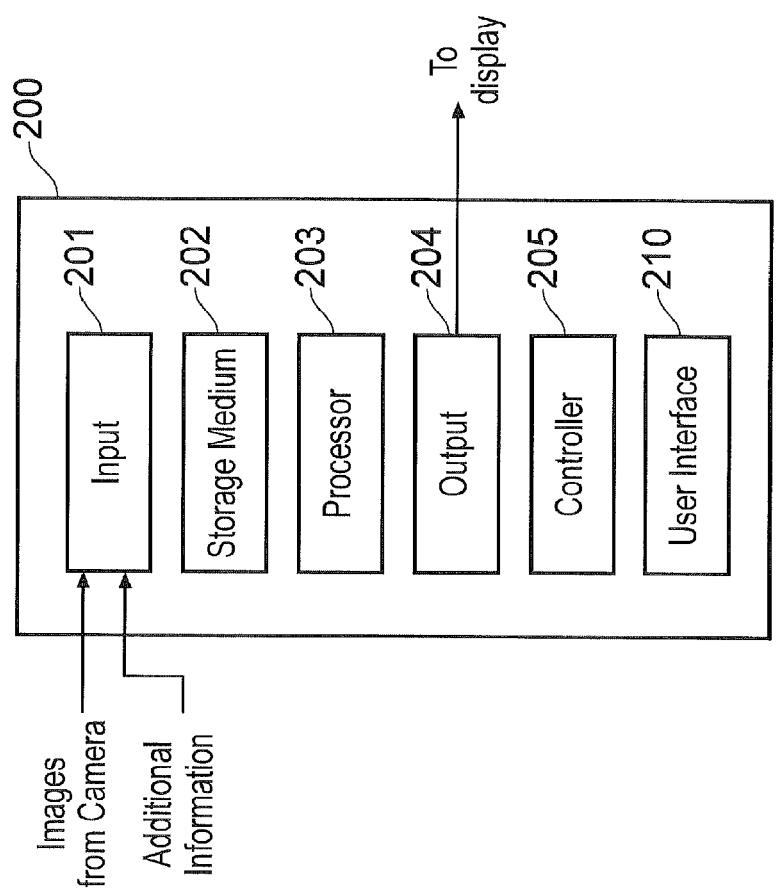

FIG. 2A schematically shows an apparatus 200 according to an embodiment of the present disclosure. The apparatus comprising an input 201, storage medium 202, processor 203 and output 204. Each of these components is controlled by a controller 205. The input receives images captured by the camera 101 and, optionally, also receives additional information (to be explained later on). The apparatus 200 may be comprised within the vehicle 100 or, alternatively, may be located remotely from the vehicle 200. In the case that the apparatus 200 is comprised within the vehicle, the images captured by the camera may be transmitted from the camera to the input 201 via any suitable wired or wireless connection. On the other hand, in the case that the apparatus 200 is located remotely from the vehicle 100, the images captured by the camera are transmitted from the camera to the input 201 via a suitable wireless connection. The output 204 outputs a position of the vehicle 100 on the track that has been determined on the basis of the images captured by the camera 100. This position is then transmitted to a display device 206 (such as that shown in FIG. 2B). The display device 206 comprises a display 207 (such as a liquid crystal display) and a graphics processor (not shown) to graphically display an image 208 representative of the track and images 209 representative of vehicles on the track (including the vehicle 100). The position on the track (and therefore on the image 208 representative of the track) of each vehicle represented by an image 209 is known based on the position of that vehicle which is received from an output 204 of an apparatus 200 like that shown in FIG. 2A. That is, each vehicle on the track is equipped with a camera 101 which feeds captured images to the input 201 of an apparatus 200. Based on the captured images, the apparatus 200 then outputs a position of that vehicle to the display device 206. Thus, the position of each of a plurality of vehicles on a track can be tracked and display simultaneously. This is useful for tracking the position of each vehicle during a race, for example. The position of each vehicle may be tracked in this way using a single apparatus 200. In this case, a single apparatus 200 receives captured images (and, optionally, additional information) from all vehicles on the track (with the captured images from each vehicle comprising a unique identifier associated with that vehicle, for example) and outputs a position of each of those vehicles to the display device 206. Alternatively, the camera 101 of each vehicle may transmit its captured images to a different respective apparatus 200. In this case, each apparatus 200 transmits the determined position of its respective vehicle to the display device 206 (with the determined position of each vehicle being transmitted with a unique identifier associated with that vehicle, for example). It will be appreciated that the determined position of each vehicle may be transmitted from the output 204 to the display device 206 via any suitable wired or wireless connection. In particular, for example, in the case that each apparatus 200 is located remotely from its respective vehicle at the same location as the display device, the connection may be a suitable wired or wireless connection. On the other hand, for example, in the case that each apparatus 200 is comprised within its respective vehicle, the connection will be a suitable wireless connection. A typical example location of the display device 206 will be a broadcasting studio. In this case, the generated images 208 and 209 of the track and vehicles may also be broadcast via television or via the internet, for example. This allows remote viewers watching the race via television or the internet to view the images 208 and 209 and to therefore keep up to date with the position on the track of each vehicle during the race. In this case, the devices (such as a television, personal computer, laptop computer, tablet computer or smart phone, for example) to which the images 208 and 209 are broadcast and so as to allow such remote viewers view the images 208 and 209 are also examples of a display device 206. The display device 206 may also be located at the track itself (for example, so that viewers actually attending a race in person, who will typically stand or sit at one location on the track, can view the progress of the vehicles in the race even during the times in which they cannot see the actual vehicles) or may be an in-vehicle display device so that a driver of a vehicle can monitor their progress in the race together with the progress of the other racing vehicles.

In order for the apparatus to determine the position of a particular vehicle 100 on the track 102, the storage medium 202 stores a map of the track comprising a representation of one or more features of the track and a position of the vehicle on the map.

The map of the track may have been generated, for example, on the basis of an electronic architectural model of the track or publicly available geographical information about the track (as obtained from a service such as Google Earth®, for example). Alternatively, if a second camera is fitted to the vehicle in addition to the camera 101 such that the two cameras are able to produce stereoscopic images, then the map may have been generated by the vehicle completing a circuit (lap) whilst stereoscopic images of the track are captured. A suitable technique may then be applied on the basis of the captured stereoscopic images so as to obtain a map of the track. Such techniques, such as simultaneously location and mapping (SLAM) techniques, are known in the art and will therefore not be described in detail here.

The position of the vehicle on the track may have been generated, for example, based on a known starting position of the vehicle or based on the vehicle passing a timing loop on the track. Alternatively, in the case that a second camera is fitted to the vehicle in addition to the camera 101 such that the two cameras are able to produce stereoscopic images (on the basis of which the map of the track may be generated—see above), the position of the vehicle on the track may also be determined on this basis. For example, if a suitable SLAM technique is used, then, as well as the map of the track being generated, the position of the vehicle on the map (and therefore on the track) will also be generated.

The input 201 then receives, from the camera 101 attached to the vehicle 100, a plurality of images captured by the camera as the vehicle travels along the track. The plurality of images are successively captured at an image capture rate sufficiently high as to allow the position of the vehicle 100 to be tracked on the basis of the images. For example, the images may be captured at a rate of 24, 50, 60, 100 or 200 images per second (or any other image rate determined to be suitable by the skilled person).

For each of the plurality of captured images, the processor 203 then performs feature recognition on the image (using any suitable image feature recognition technique, as known to the skilled person). An indicator is then assigned to each recognised feature in the image. The indicator is indicative of the suitability of the recognised feature for adjusting the position of the vehicle on the map based on the recognised feature. Then, for each recognised feature in the image with an indicator which indicates that the recognised feature is suitable for adjusting the position of the vehicle on the map based on the recognised feature, when the recognised feature is already represented in the map of the track, the position of the vehicle on the map is adjusted based on the position of the representation of the recognised feature in the map. The representation of the recognised feature in the map of the track may also be adjusted based on the recognised feature. On the other hand, when the recognised feature is not already represented in the map of the track, a representation of the recognised feature is added to the map. The adjusted position of the vehicle on the map (and therefore on the track), together with any new or adjusted representation of a recognised and suitable image feature in the map, is then stored in the storage medium 202 and output to the display device 206.

The indicator indicative of the suitability of each recognised feature in each of the plurality of images is determined based on a consistency of the appearance of the recognised feature in two or more of the plurality of images. A greater consistency in the appearance of the recognised feature in the two or more of the plurality of images is associated with an indicator indicative of a greater suitability of the recognised feature for adjusting the position of the vehicle on the map based on the recognised feature. As will be explained, an example of such a recognised feature is a racing line painted on the track in a colour which contrasts with the colour of the tarmac of the track and which appears consistently in two or more of the plurality of images (in particular two or more successively captured ones of the plurality of images). On the other hand, a lesser consistency in the appearance of the recognised feature in the two or more of the plurality of images is associated with an indicator indicative of a lesser suitability of the recognised feature for adjusting the position of the vehicle on the map based on the recognised feature. As will be explained, an example of such a recognised feature is a race marshal (person) who appears in only one of the plurality of images or appears very differently in each of two or more of the plurality of images.

The above-described arrangement will now be exemplified in more detail.

Figure 3:
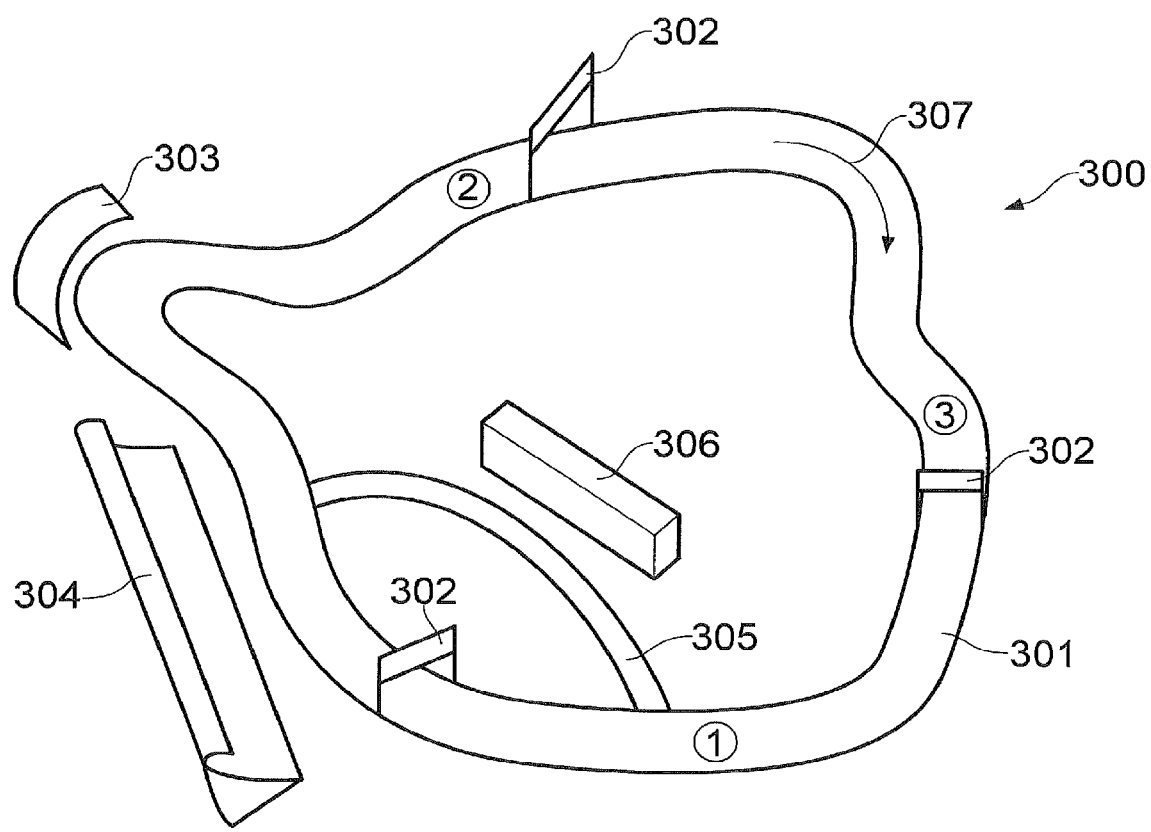
FIG. 3 schematically shows a map of a track according to an embodiment of the present disclosure.

FIG. 3 schematically shows a map 300 of a track 102 according to an embodiment of the present disclosure. The map in this case is an electronic map stored in the storage medium 202 and is defined by electronic representations of features of the real life track. In this case, the map 300 comprises electronic representations of a tarmac circuit 301 on which the vehicle 100 travels, banners 302 periodically placed along the tarmac circuit 301, a barrier 303 positioned at an edge of the tarmac circuit 301, a grandstand 304 where spectators may watch the race, a pit lane 305 which is a further tarmac strip connecting two points of the tarmac circuit 301 along which vehicles may attend a pit stop (for refuelling, adjustment and/or repairs) and a pit lane building 306 which contains the tools and personnel necessary for carrying out the pit stop. Only a small number of features of the map 300 are shown in FIG. 3. This is for clarity of explanation. It will be appreciated that, in reality, the map 300 may contain a significantly larger number of features in order to more accurately represent the track 102 and the position of the vehicle 100 on the track. The map 300 may be generated in one of the ways described above and is stored in the storage medium 202 as an electronic 3D graphics file, for example.

As the vehicle 100 travels around the track 102 in real life, the camera 101 captures images of the track at a given image capture rate (as previously described). Feature recognition is then performed on each captured image and the suitability indicator of each recognised feature determined. Recognised features which are sufficiently suitable (as indicated by their respective suitability indicators) are then used in a matching process by the processor 203 in order to determine which features of the map 300 of the track are present in a particular image. Once these features have been determined, the position of the vehicle 100 (or, more specifically, the camera 101 attached to the vehicle 100) can be determined based on the position of each of these features in the captured image and one or more lens parameters of the camera (including, for example, the focal length of the lens and the amount of lens distortion).

Furthermore, sufficiently suitable features which are recognised in a captured image but which are not currently represented in the map may be added to the map. Such processes, in which recognised features in a captured image of a scene are matched with features represented in a 3D map of the scene so as to determine the position of the camera in the scene and to update the map are known in the art (for example, various SLAM techniques may be used) and will therefore not be discussed in detail here. However, with the present technique, the position of the vehicle 100 on the map 300 may be determined more accurately than with such standard techniques due to the use of the suitability indicator assigned to each recognised image feature and, optionally, the use of additional information to that which represents the map 300. This is described in more detail later on.

Figure 4A:
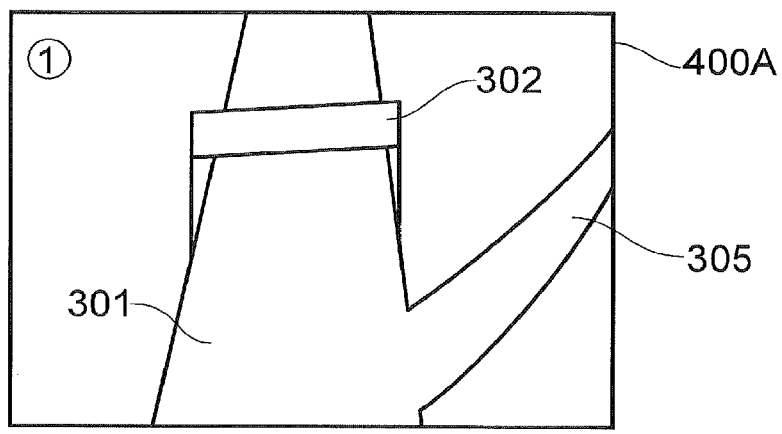
FIGS. 4A to 4C schematically show an example technique for determining a position of a vehicle on a track according to an embodiment of the present disclosure.
Figure 4B:
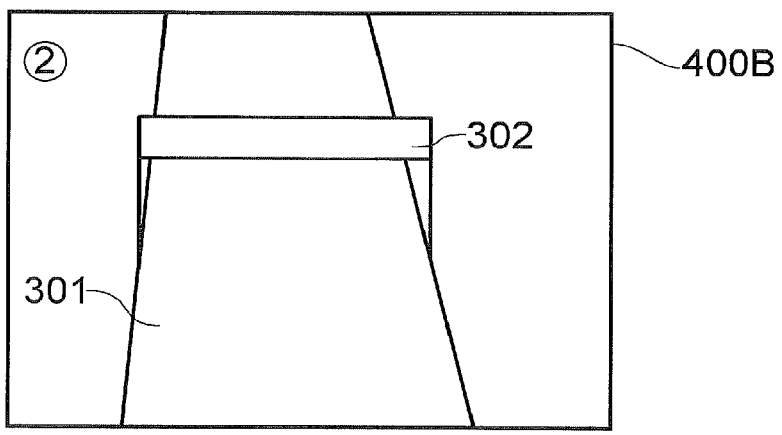
Figure 4C:
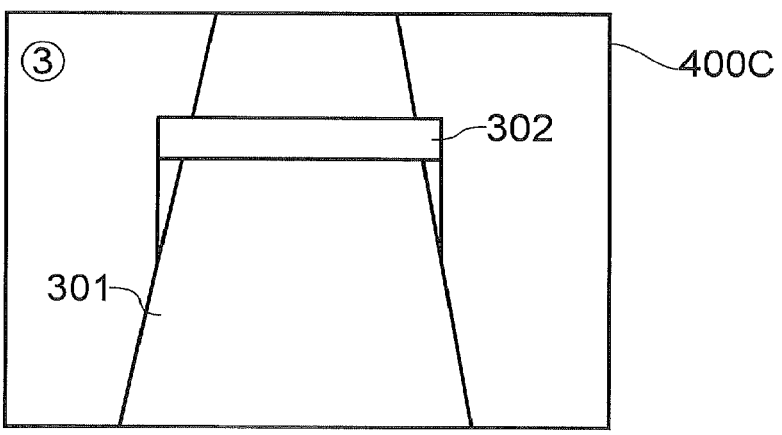

An example technique is schematically demonstrated with reference to FIGS. 4A to 4C. Each of FIGS. 4A to 4C shows an image captured by the camera 101 when the vehicle 100 is at a different respective position on the track. In particular, FIG. 4A represents an image 400A captured by the camera when the vehicle is located at position "1" on the track, FIG. 4B represents an image 400B captured by the camera when the vehicle is located at position "2" on the track and FIG. 4C represents an image 400C captured by the camera when the vehicle is located at position "3" on the track (each of the positions "1", "2" and "3" are shown on the map 300 of the track in FIG. 3). The images 400A to 400C are captured as the vehicle 100 travels around the track in the direction indicated by arrow 307 on the map 300.

Looking first at the captured image 400A of FIG. 4A, it can be seen that three features, the tarmac circuit 301, one of the banners 302 and the pit lane 305, are recognisable in the image. Each of these features is determined to be sufficiently suitable for determining the position of the vehicle, and the processor 203 therefore performs the matching process with the map 300 on the basis of these recognisable features. Based on the matching process, the positions of each of these features in the image 400A, the positions of the representations of these features in the map 300 and the lens parameters of the camera (which are known to the processor 203 in advance—values of these parameters may be stored in the storage medium 202, for example), the processor 203 is able to determine that the position of the camera 101 (and therefore of the vehicle 101) is indeed position "1" as indicated on the map 300 in FIG. 3. The processor therefore adjusts the position of the vehicle stored in the storage medium 202 so that the stored position of the vehicle is now position "1" as indicated on the map 300 in FIG. 3.

Looking now at the captured image 400B of FIG. 4B, it can be seen that only two features, the tarmac circuit 301 and one of the banners 302, are recognisable in the image. Each of these features is determined to be sufficiently suitable for determining the position of the vehicle, and the processor 203 therefore again performs the matching process with the map 300 on the basis of these recognisable features. Because there are only two features this time, however, based on the matching process, the positions of each of these features in the image 400B, the positions of the representations of these features in the map 300 and the lens parameters of the camera, the processor 203 is only able to determine that the position of the camera 101 (and therefore of the vehicle 101) is one of positions "2" or "3" as indicated on the map 300 in FIG. 3. This is because, in both position "2" and position "3", according to the model 300, it is expected that only the tarmac circuit 301 and a banner 302 will be recognisable in an image captured by the camera. The processor 203 therefore needs further information in order to decide which of the positions "2" and "3" on the map is the correct position. In an embodiment, the previous position of the vehicle (as currently stored in the storage medium 202) is used in order to make this decision. For example, the processor 203 may determine the position which is closest to this previous position to be the correct position. Alternatively, or in addition, the processor may use additional information (examples of which are explained later on) received by the input 201 of the apparatus 200 in order to determine the correct position. In this case, using the previous position of the vehicle and/or additional information, the processor correctly determines position "2" to be the correct position of the vehicle 100.

Looking now at the captured image 400C of FIG. 4C, it can be seen that, again, only the two features of the tarmac circuit 301 and one of the banners 302 are recognisable in the image. Each of these features is determined to be sufficiently suitable for determining the position of the vehicle, and the processor 203 therefore again performs the matching process with the map 300 on the basis of these recognisable features. Furthermore, based on the matching process, the positions of each of these features in the image 400C, the positions of the representations of these features in the map 300 and the lens parameters of the camera, the processor 203 is again only able to determine that the position of the camera 101 (and therefore of the vehicle 101) is one of positions "2" or "3" as indicated on the map 300 in FIG. 3. However, in the same manner as described for the image 400B of Figure B, the processor 203 is able to use further information (such as the previous position of the vehicle and/or additional information received by the input 201 of the apparatus 200) to correctly determine the position "3" to be the correct position of the vehicle.

It will therefore be appreciated that, based on the recognition of image features, the determination of the suitability of those image features, the matching of suitable image features with those represented in the map 300 and the determination of the position of the camera (and therefore the vehicle) based on the position in the captured image of the matched features, the position of the representations of the matched features in the map 300 and the lens parameters of the camera, together with further information (such as the previous position of the camera and/or additional information received by the input 201 of the apparatus 200), the position of the vehicle on the map 300 (and therefore on the track in real life) can be accurately tracked. This tracking is able to occur in real-time as images are captured by the camera and processed (thus allowing, for example, the position of the vehicle 100 to be updated at a rate equal to the image capture rate).

In addition to being able to track the position of the vehicle 100 on the track, the representation of features of the map which are recognised and deemed sufficiently suitable in a captured image may be adjusted on the basis of new information associated with those features which is obtained from the captured image. This allows the representations of the features of the map to be continuously improved as the vehicle travels around the track and as images of the track are captured. The accuracy of the map of the track (and therefore of the determined position of the vehicle on the track) is therefore continuously improved. In addition, representations of features of the track which do not currently form part of the map may be added to the map when those features are recognised in a captured and are determined sufficiently suitable for use in determining the position of the vehicle. Thus, as well as the accuracy of the current features of the map being continuously improved, new features may also be added to the map.

Figure 5A:
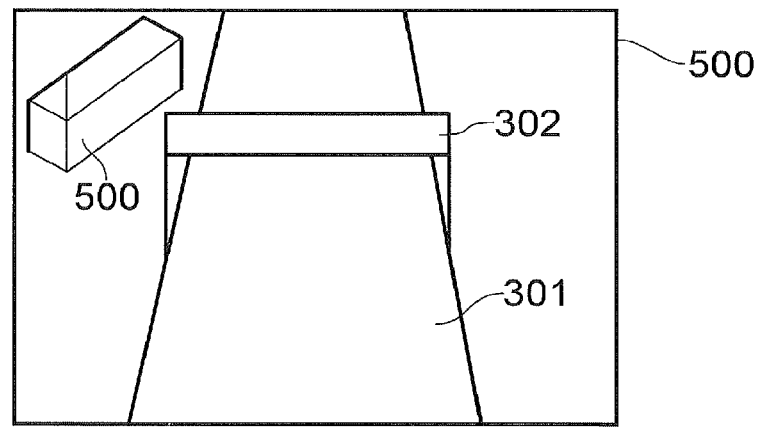
FIGS. 5A and 5B schematically shows an example technique for adding a representation of a feature to a map according to an embodiment of the present disclosure.
Figure 5B:
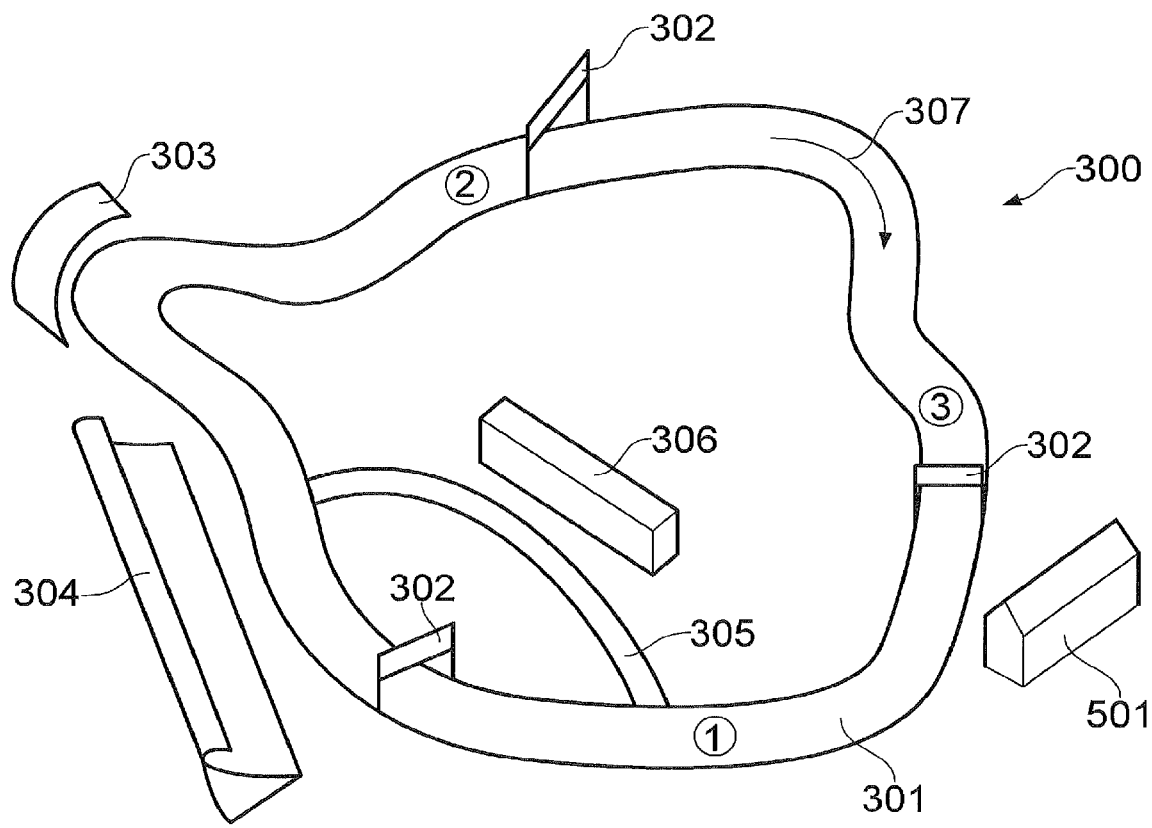

Such an arrangement is schematically exemplified with reference to FIGS. 5A and 5B. Here, it can be seen that, when the vehicle 100 is positioned at position "3", a further feature, building 501, is recognisable in an image 500 captured by the camera 101 (see FIG. 5A). A representation of the building 501 is not present in the map 300 shown in FIG. 3. However, if this feature is determined to have a sufficient suitability for the position of the vehicle 100 to be determined on the basis of this feature, a representation of this feature is added to the map. This is shown in FIG. 5B, in which it can be seen that a representation of the building 501 has been added at an appropriate location in the map 300. The correct location of the building 501 in the map 300 may be determined, for example, based on the recognition of the building 501 in one or more images, its position in each of the one or more images relative to objects in those images which are already represented in the map and the lens parameters of the camera.

It is noted that the adjustment and/or addition of features of a 3D map of a scene like map 300 on the basis of captured images of that scene may be carried out using various techniques (such as SLAM techniques) known in the art. However, it should be noted that, with the present technique, because it is only representations of recognised image features which are determined to be sufficiently suitable (based on the respective suitability indicator of each recognised image feature) for use in determining the position of the vehicle on the map which are added and/or adjusted on the map, the accuracy with which the map and the position of the vehicle on the map is updated is improved.

Figure 6A:
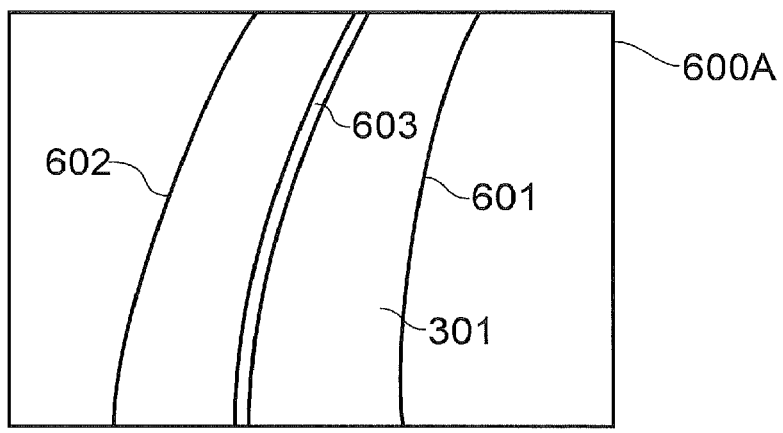
FIGS. 6A to 6C schematically illustrate assigning suitability indicators to recognised features in a plurality of captured images according to an embodiment of the present disclosure.
Figure 6B:
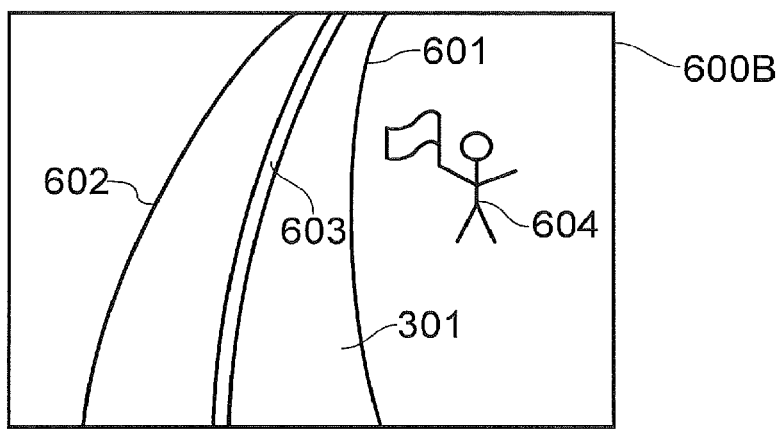
Figure 6C:
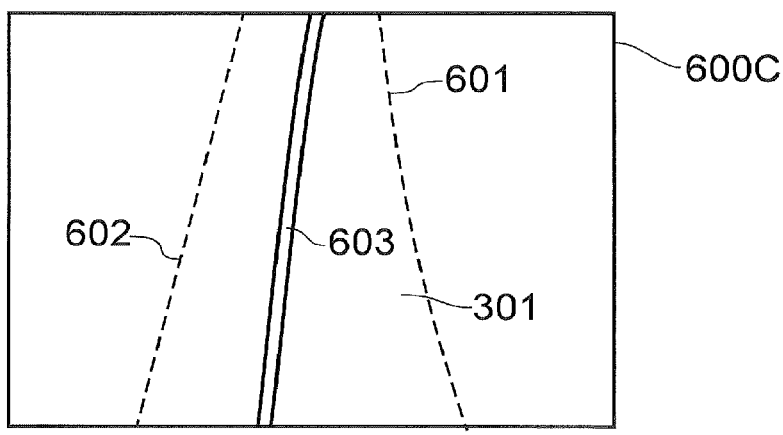

FIGS. 6A to 6C schematically illustrate the generation and adjustment of the above-described suitability indicators according to an embodiment. Each of FIGS. 6A to 6C shows one of a plurality of successively captured images (so that image 600A of FIG. 6A is captured, followed immediately by image 600B of FIG. 6B, followed immediately by image 600C of FIG. 6C). For the sake of clarity of explanation, only three successively captured images are shown in FIGS. 6A to 6C and the capture rate of these successively captured images is relatively low. However, it will be appreciated that, in reality, the described technique may be applied taking into account a larger number of images captured at a much higher image capture rate.

The captured image 600A of FIG. 6A is the first successively captured image, and includes the tarmac circuit 301 with a right edge 601, a left edge 602 and a racing line 603 which is painted on the tarmac in a colour which contrasts with the colour of the tarmac so as to make it easily recognisable. For example, if the tarmac is black or grey, then the racing line 603 may be painted yellow or white. The edges 601 and 602 represent the boundary of the tarmac circuit 301 such that, outside of these edges, there is no tarmac and instead there is another substance with a contrasting colour to that of the tarmac so that the edges 601 and 602 are easily recognisable. For example, if the tarmac is black or grey, then the further substance may be grass (which is green) or gravel (which is white). It is noted that by "easily recognisable", it is meant that a suitable image feature recognition algorithm (as known in the art) implemented by the processor 203 may easily recognise each of the racing line 603 and edges 601 and 602 in the image 600A.

When the image 600A is captured, each of the racing line 603 and edges 601 and 602 is recognised. In this example, it is assumed, for simplicity, that each of these features is recognised for the first time in the captured image 600A. The processor 203 therefore assigns an initial suitability indicator to each of these features. In this example, for the sake of clarity of explanation, the suitability indicator is a numerical value between 1 and 3, although it will be appreciated that the suitability indicator may be of any other suitable format. Because each of the features 601, 602 and 603 have been recognised for the first time in the image 600A, each of the features is assigned the same initial suitability indicator. In this case, each feature is assigned an initial suitability indicator of 1. The suitability indicator of each recognised feature of each captured image at a given time (as exemplified by Table 1) is stored in the storage medium 202, for example.

When the image 600B is captured, each of the racing line 603 and edges 601 and 602 is again recognised. By a suitable feature tracking method which enables a feature recognised in a first image to be recognised as that same feature in a second, subsequently captured image (such tracking methods are known in the art), the processor 203 is able to determine that each of the recognised features 601, 602 and 603 have been recognised for the second time in the captured image 600B. The suitability indicator of each of these features is therefore increased to 2. Furthermore, however, a race marshal 604 is also recognised in the image 600B. This is the first time the race marshal 604 has been recognised. The race marshal 604 as a recognised object is therefore assigned a suitability indicator of 1.

When the image 600C is captured, the racing line 603 is again recognised in the captured image. The processor 203 is also able to determine, based on the tracking method used, that this is the third time that the racing line 603 has been recognised. The suitability indicator of the racing line 603 is therefore increased to 3. However, in this case, the edges 601 and 602 of the tarmac strip 301 have been become obscured and are no longer recognisable in the image 600C. This may occur due to any number of reasons, such as weather, lighting and shadows, occlusions or a change in colour of the substance other than tarmac at each boundary of the tarmac strip 301 so that the tarmac and this other substances are less distinguishable than before. The race marshal 604 is also no longer present in the image 600C. Thus, the suitability indicator remains the same for each of the edges 601 and 602 and for the race marshal 604.

The suitability indicator assigned to each of the features 601, 602, 603 and 604 for each of the successively captured images 600A to 600C is shown in Table 1.

| Feature | 1$^{st}$ image 600A | 2$^{nd}$ image 600B | 3$^{rd}$ image 600C |
|---|---|---|---|
| Right edge 601 | 1 | 2 | 2 |
| Left edge 602 | 1 | 2 | 2 |
| Racing line 603 | 1 | 2 | 3 |
| Race marshal 604 | 0 | 1 | 1 |

After all three images 600A to 600C have been captured, it can be seen that, due to the greatest consistency of the appearance of the recognised racing line 603 in the successively captured images (having appeared in all three images), the racing line 603 as a recognised image feature has the highest suitability indicator of 3. It is followed by each of the edges 601 and 602, which each have the next greatest consistency of appearance in the successively captured images (having appeared in two of the three images) and which have a suitability indicator of 2. The edges are, in turn, followed by the race marshal 604, which has the least consistency of appearance in the successively captured images (having appeared in only one of the three images) and which has a suitability indicator of 1.

In this case, the processor 203 will thus consider the racing line 603 to be the most suitable feature in determining the position of the vehicle 100 on the map 300, the edges 601 and 602 as the next most suitable features and the race marshal 604 as the least suitable feature. Whether or not a particular feature is sufficiently suitable may be determined in a number of ways. For example, a feature may be determined as sufficiently suitable only if the suitability indicator for that feature exceeds a predetermined threshold. In the example of FIGS. 6A to 6C, the suitability indicator threshold may, for example, be set at 2, meaning that only the racing line 603 and edges 601 and 602 are considered sufficiently suitable, or may even be set at 3, meaning that only the racing line 603 is considered sufficiently suitable. Alternatively, or in addition, in order to ensure that a feature is chosen for determining the position of the vehicle 100 even if the suitability indicator of no recognised feature exceeds a predetermined threshold, feature(s) with the highest suitability indicator(s) may be chosen for determining the position of the vehicle. So, for example, in FIGS. 6A to 6C, only the top ranked feature (that is, the racing line 603 with suitability indicator 3) or the top two ranked features (that is, the racing line 603 with suitability indicator 3 and the edges 601 and 602 each with suitability indicator 2) in terms of the determined suitability indicator for each feature may be chosen. It is also noted that, in an embodiment, the suitability indicator of a particular feature may also be reduced if, for example, that feature is not recognised for a predetermined number of consecutively captured images. Such an arrangement allows the suitability indicator of each recognised image feature to be dynamically updated as the vehicle 100 travels around the track 102, thus ensuring that only the most suitable features are used in determining the position of the vehicle 100 and in updating the map 300.

It will be appreciated that, although not shown on the map 300, each of the features 601, 602, 603 and 604 must be represented in the map 300 in order for them to be used in determining the position of the vehicle 100 on the map 300 in the way described above (that is, based on matching recognised features in a captured image with representations of those features in the map). Each of these features (together with any other sufficiently suitable feature on the basis of which the position of the vehicle 100 may be determined) may either be in the original map stored in the storage medium 202 or may be added to the map as the vehicle travels around the track and as images are captured by the camera 101 (as previously described).

It will be appreciated that FIGS. 6A to 6C relate merely to a simplified example of how suitability indicators may be used with the present technique. More generally, the indicator indicative of the suitability of each recognised feature in each of a plurality of captured images is determined based on a consistency of the appearance of the recognised feature in two or more of the plurality of images. A greater consistency in the appearance of the recognised feature in the two or more of the plurality of images is associated with an indicator indicative of a greater suitability of the recognised feature. On the other hand, a lesser consistency in the appearance of the recognised feature in the two or more of the plurality of images is associated with an indicator indicative of a lesser suitability of the recognised feature. In an embodiment, the suitability indicator of each feature is a number which is increased when that feature is recognised in a predetermined number of the plurality of images (in particular, in a predetermined number of successive (consecutive) ones of the plurality of images) and which is decreased when that feature is not recognised in a predetermined number of the plurality of images (in particular, in a predetermined number of successive (consecutive) ones of the plurality of images). A feature is then determined as sufficiently suitable when, for example, its current suitability indicator exceeds a predetermined threshold and/or is the highest or one of the highest rank features in terms of its suitability indicator (for example, when the feature has a suitability indictor within the top x suitability indicators of all recognised features for which a suitability indicator is recorded). This enables dynamic adjustment of the suitability indicators of each recognised feature as the vehicle travels around the track and as images are captured, and ensures that only the most suitable features are used for determining the position of the vehicle and for updating the map at any given time. It will be appreciated that, in general, the skilled person may determine any other suitable method of determining which features are sufficiently suitable for use in determining the position of the vehicle 100 based on the determined suitability indicator of each of those features.

It will be appreciated that, in the embodiment described with reference to FIGS. 6A to 6C, the features recognised in a captured image (the right edge 601, left edge, 602, the racing line 603 and the race marshal 604) are merely examples and that other features which are both included in the map and which are recognisable in an image captured by the camera 101 may also be used in the way as described. In particular, it is noted that, although a racing line 603 is used as an example of such a feature, other types of lines which are marked out on the tarmac circuit 301 (for example, lines marking the position of timing loops, a finish line or lines marking respective starting positions of vehicles) may be used. Marked lines on the tarmac circuit 301 are often particularly suited for use with the present technique due to the fact that they are easily recognisable against the surface of the tarmac circuit 301 and appear consistently from image to image.

In an embodiment, as well as the processor 203 being able to automatically determine the most suitable features in an image on the basis of which to determine the position of the vehicle 100 (based on the indicator assigned to each feature), it is also possible for a user to manually select a particular feature of an image or images which that user believes to be suitable for determining the position of the vehicle 100. In one embodiment, the output 204 outputs a captured image or images to the display device 206. A user is then able to select a particular feature from the captured image or images using the user interface 210 of the apparatus 200. The user interface 210 may include a mouse or trackpad, for example, which allows a user to select a suitable feature shown in a captured image displayed on the display device 206 by moving a cursor and clicking the mouse when the cursor is positioned over the feature of choice. Alternatively, if the display 207 of the display device 206 is a touch screen display, then the user may simply touch the display 207 at the position of the feature of choice when a captured image is displayed on the display 207. In this case, the user interface 210 is an interface which is configured to receive an electronic signal from the display device 206 indicative of the position of the display 207 which has been touched, thus allowing the processor 203 to determine the position of the displayed captured image corresponding to the touch and thus the feature of the displayed captured image which has been selected. It will be appreciated that there are also other ways in which a feature of a captured image could be manually selected. In the case that a feature of the displayed captured image which is also included in the map 300 has been selected, this feature is used for determining the position of the vehicle. This manual selection may override any automatic selection of features based on the suitability indicator so that, even if the automatically determined suitability indicator for a particular feature is low (and thus that feature would not normally be considered for use in determining the position of the vehicle), if that feature is manually selected by the user, the feature will nonetheless be used in determining the position of the vehicle. This allows a user to ensure that features which the user considers to be reliable in determining the position of the vehicle are indeed used in determining the position of the vehicle, even if the automatically determined suitability indicator for that feature means that the feature would not normally be used. In one embodiment, a manually selected feature is used in addition to the features which are automatically selected (on the basis of the determined suitability indicators). In another embodiment, one or more of the automatically selected features is replaced with the manually selected feature. For example, the automatically selected feature(s) with the lowest suitability indicator(s) may no longer be used in determining the position of the vehicle when the manually selected feature is used.

Figure 7A:
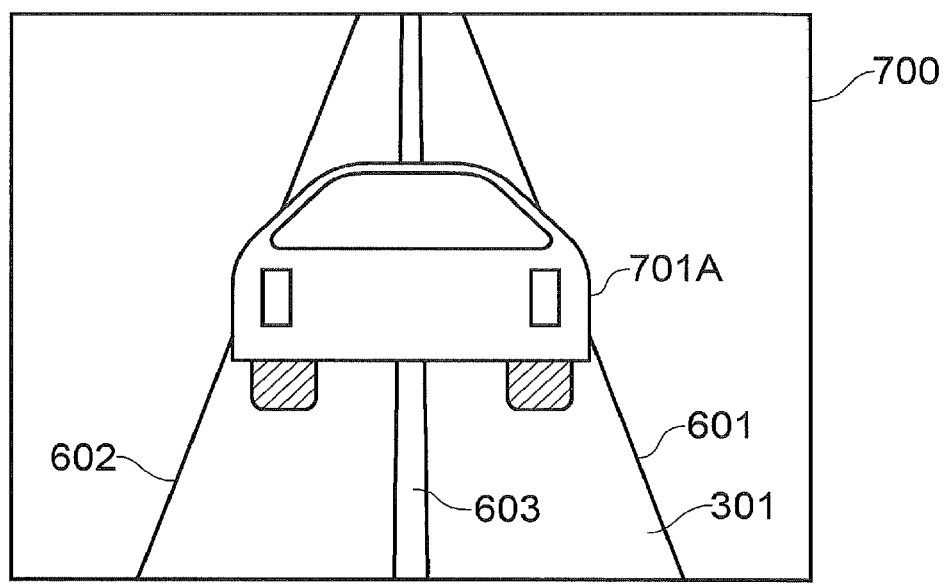
FIGS. 7A and 7B schematically illustrate a further technique for determining a position of a vehicle on a track according to an embodiment of the present disclosure.
Figure 7B:
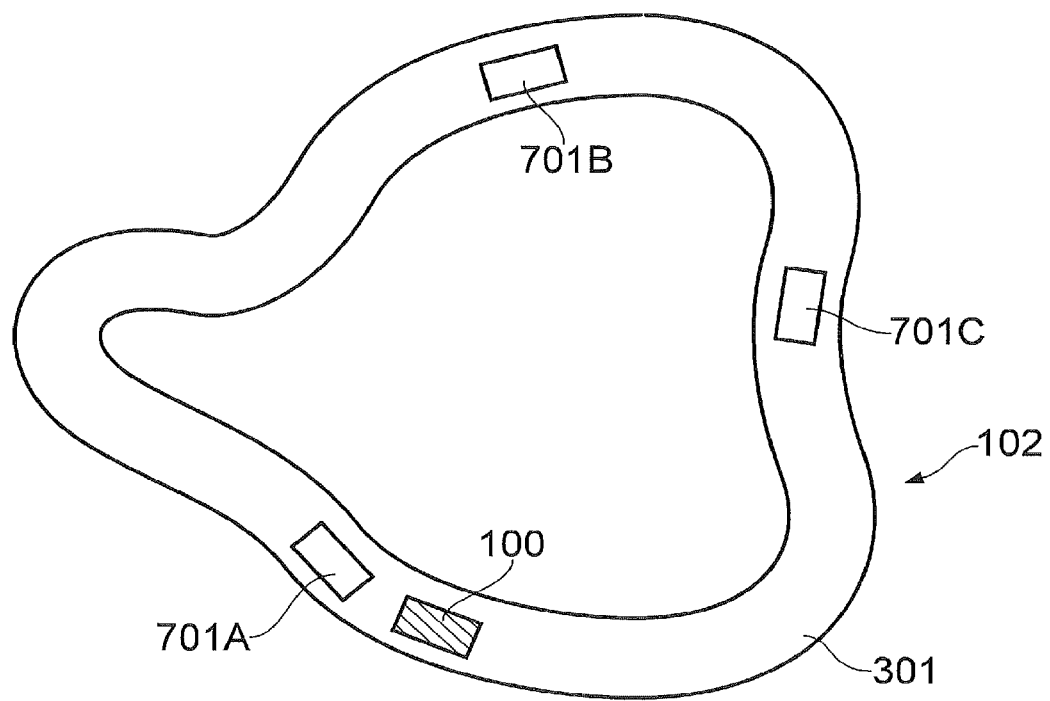

It will be appreciated that, although in the embodiments of FIGS. 6A to 6C, each of the captured images 600A to 600C is a successively captured image, in another embodiment, a plurality of images may be captured such that each image is captured at the same location as the vehicle 100 travels around the track 102. In this case, the same mechanism as described above is used for determining a suitability indicator of each recognised feature in each captured image. However, since each captured image is captured at the same location (and therefore is captured with the same field of view of the track 102), the recognisable features in each captured image will be the same unless one or more characteristics of the image have changed. For example, for a given set of images each captured when the vehicle 100 is at a given location on the track 102 but at a different respective time, differences in lighting, shadow, weather, etc. or even physical changes to the track 102 (for example, the removal of a feature or the occlusion of one feature by another, such as the occlusion of a painted line on the track by tyre marks from vehicles travelling over the painted line) may result in features which were recognisable in a previous image being no longer recognisable or, on the other hand, features which were not recognisable in a previous image becoming recognisable. It will be appreciated, therefore, that different features may be recognisable in different images even when those images are captured by the camera 101 when the vehicle 100 is at the same given position on the track. Suitability indicators may therefore be assigned to each recognised feature in the captured images in a similar way to that previously described (thus, for example, a feature which is present in a larger number of a given set of captured images will have a higher suitability indicator indicating that it is more suitable for use in determining the position of the vehicle and a feature which is present in a smaller number of a given set of captured images will have a lower suitability indicator indicating that it is less suitable for use in determining the position of the vehicle). In this way, the features to be used for determining the position of the vehicle based on the captured images are dynamically adjusted in the same way as before (including in the way that such features may be added to the map 300 if they are not already in the map 300 but are determined to be suitable based on their respectively determined suitability indicators). The difference is that the updating of features relies on a plurality of images captured at the same position on the track 102 (that is, on a lap by lap basis, for example, as the vehicle completes laps around the track) rather than a plurality of images captured successively as the vehicle 100 moves along the track. In this case, it is noted that the current position of the vehicle may be determined based on one or more recognised features in the latest captured image. An image captured when the vehicle was most closely located to that position during one or more of the previous laps may then be determined, and suitability indicators of each of the features in those images may then be determined. The current position of the vehicle may then be recalculated based on the recognised features of the latest captured image, taking into account the determined suitability indicators for that image. In such a scenario, the processor 203 may know which images correspond to each lap of the vehicle (thus allowing suitable images of previous laps to be obtained) based on, for example, time loop data fed into the input 201 as additional information (for example, the processor 203 will know that images x1 to xn were captured during a first lap, images y1 to yn were captured during a second lap and images z1 to zn were captured during a third lap based on time loop data indicating the time at which the vehicle begins a new lap and the time at which each image is captured). FIGS. 7A and 7B schematically illustrate a further embodiment of the present technique. As previously mentioned, the present technique can be used to track the position of a plurality of different vehicles on the track simultaneously. In this case, as shown in FIG. 7B, as well as the vehicle 100 travelling along the tarmac circuit 301 of the track 102, other vehicles 701A to 701C are also travelling on the tarmac circuit 301 of the track 102. Furthermore, one of the other vehicles 701A is in front of the vehicle 100 such that part of the view from the camera 101 attached to the vehicle 100 is obscured.

This is shown in the captured image 700 of FIG. 7A. It can be seen that, because of the presence of the other vehicle 701A, the racing line 603 and edges 601 and 602, which, in this example, have been determined as features with a sufficient suitability for use in determining the position of the vehicle 100, are partially obscured by the other vehicle 701A. As a result, there is the possibility that these features will not be correctly recognised in the image 700, thus leading problems in determining an updated position of the vehicle 100.

Thus, in an embodiment, the storage medium 202, as well as storing the current position of the vehicle 100, also stores the current position of each of the other vehicles 701A to 701C. Such an arrangement will naturally occur when a single apparatus 200 is used to track the position of each vehicle on the track. On the other hand, in the case that the position of each vehicle on the track is tracked by a different respective apparatus 200, then, for example, the output 204 of each apparatus 200 will transmit information indicative of the current track position of its respective vehicle and the input 201 of each apparatus 200 will receive this information from each of the other apparatuses 200.

When the processor 203 performs the feature recognition on the image 700, the vehicle 701A will be recognised in the image as a vehicle (suitable techniques for this are known in the art). In one example, the exact vehicle 701A may be recognised. This is possible if, for example, each vehicle is provided with a unique visual marker (such as a Quick Response (QR) code) or the like which is recognisable in the captured image 700 by the processor 203. In another example, the exact vehicle 701A may not be recognisable in the captured image 700 by the processor 203. In this case, the processor 203 knows that one of the other vehicles on the track has been recognised, but does not know exactly which vehicle has been recognised (in this case, vehicle 701A) from the captured image 700 alone. However, the processor 203 is again able to use further information in order to deduce which of the other vehicles must have been captured in the image 700. In an embodiment, the previous position of the vehicle (as currently stored in the storage medium 202) is used in order to make this decision. For example, the processor 203 may determine the other vehicle which was in front of the vehicle 100 at its previous position to be the vehicle which has been captured in the image 700. Alternatively, or in addition, the processor may use additional information (examples of which are explained later on) received by the input 201 of the apparatus 200 in order to determine which of the other vehicles has been captured in the image 700.

Once the processor 203 has determined which of the other vehicles has been captured in the image 700 (in this case, it is the other vehicle 701A), it may then determine the current position of the vehicle 100 based on the position of the determined other vehicle 701A. More specifically, the determination of the position of the vehicle 100 may be determined based on the position in the captured image of the other vehicle 701A, the position of a representation of the recognised other vehicle 701A on the map 300 (which may be included on the map due to the fact that the position of the other vehicle 701A has already been determined—see below—and that the size and shape of the recognised other vehicle 701A are known in advance and stored in the storage medium 202) and the lens parameters of the camera. In this way, the other vehicle 701A acts as a temporary feature of the captured image 700 and map 300 which can be used to determine the position of the vehicle 100 on the map in the way as previously described. In an embodiment, the position of the determined other vehicle 701A will have already been updated in the usual way because there is no further vehicle in front of this other vehicle 701A at this moment in time (and thus the view of the camera attached to the other vehicle 701A) is not obscured in the way as shown in FIG. 7A. Thus, an updated position of the vehicle 100 can be obtained even though the view of the camera 101 attached to the vehicle 100 has been obscured.

In a variation of this embodiment, if the position of the vehicle 100 can be accurately determined despite the fact that the vehicle 701A is located in front of it (for example, if, despite the fact that a portion of each of the edges 601, 602 and the racing line 603 is obscured in the image 700, the processor 203 is nonetheless able to recognise these features from their respective portions which remain visible in the image 700), it is possible that the position of the vehicle 701A may be determined on this basis. That is, the vehicle 701A may be recognised as a feature in the image 700 and placed on the map 300 (in a similar way to the way in which fixed features of the track 102 which are recognised in an image may be added to the map 300, as previously described). The specific vehicle 701A may be recognised in the same way as described above (for example, by a unique visual marker on the vehicle or from the fact that, at a previous position of the vehicle 100, the vehicle 701A was in front of the vehicle 100). In this way, the position of the vehicle 701A on the track may be determined based on the image captured by the vehicle 100. In one embodiment, in which each vehicle in a race is known to have the same fixed spatial dimensions (as occurs in NASCAR® racing, for example), the position of the vehicle 701A can be determined even more precisely by the processor 203 since, due to the fixed spatial dimensions, a vehicle will be known to be represented in a captured image by a certain number of pixels in a particular dimension at a particular distance from the lens of the camera 101.

Figure 8:
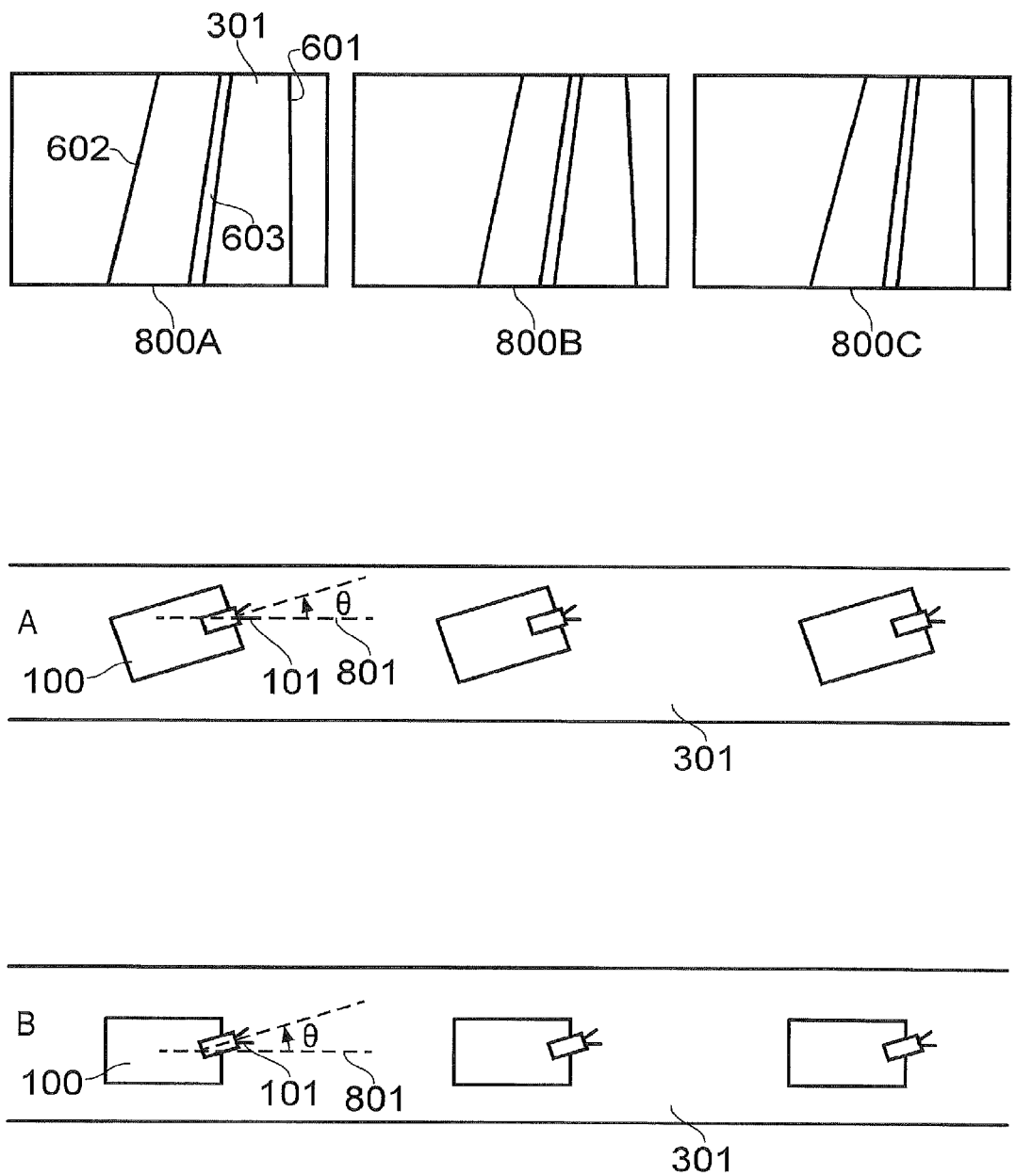
FIG. 8 schematically illustrates a further technique for determining a position of a vehicle on a track according to an embodiment of the present disclosure.

FIG. 8 schematically shows a further embodiment of the present technique. In the above-mentioned embodiments, the position of the vehicle 100 is determined on the basis of the determined position of the camera 101. In order for the position of the vehicle 100 to be determined accurately, the position of the camera 101 relative to the position of the vehicle 100 (or, in particular, relative to one or more predetermined points on the vehicle 100) must therefore be known. This relative position may be determined in advance so that, as the vehicle 100 travels around the track 102 and as the camera 101 captures images, the position of the vehicle 100 on the track 102 at a given time may be determined based on the determined position of the camera 101 on the track 102 and the position of the camera 101 relative to the position of the vehicle 100.

A problem arises, however, in the case that the position of the camera 101 relative to the position of the vehicle 100 changes whilst the vehicle is travelling around the track. Such changes are relatively common during vehicle racing, for example, where the vehicle 100 (and camera 101) is subject to extreme forces during acceleration, braking and cornering which results in a fixing (not shown) with which the camera 101 is attached to the vehicle 100 becoming loosened and/or deformed, thus changing the position of the camera relative to that of the vehicle.

In an embodiment of the present technique, the processor 203 is able to detect such changes in the position of the camera relative to the position of the vehicle based on, for example, the characteristics of the portion of the track 102 on which the vehicle 100 is currently travelling, expected motion characteristics of the vehicle 100 and the images captured by the camera 101 during this time. The processor 203 is then able to determine a new position of the camera relative to the position of the vehicle based on the detected change. This ensures that the position of the vehicle 100 itself can then continue to be tracked with suitable accuracy.

An example of this is shown in FIG. 8. In FIG. 8, the vehicle 100 is travelling along a straight portion of the tarmac circuit 301 of the track 102. The processor 203 knows that the vehicle 100 is travelling along this straight portion because of the determined position of the vehicle 102 (this being determined as previously described). In this case, however, the fixing (not shown) attaching the camera 101 to the vehicle 100 has become loosened and/or deformed, such that, looking at scenario "B" in FIG. 8 (which reflects what is truly happening), rather than the camera 101 being aligned along the axis 801 so that the field of view of the camera is that which is directly in front of the vehicle, the camera 101 is instead aligned at an angle θ to the axis 801. The processor 203 is able to determine that this is the orientation of the camera based on the captured images 800A to 800C and the features in those images (in particular, the tarmac strip 301, racing line 603 and edges 601 and 602). However, purely on the basis of the captured images 800A to 800C, the processor 203 does not know whether the scenario is scenario "A" or scenario "B" (as shown in FIG. 8). In scenario "A", the fixing attaching the camera 101 to the vehicle 100 has not become loosened and/or deformed and therefore the camera is still aligned so that its field of view is that which is directly in front of the vehicle. In scenario "A", it is therefore the vehicle which is aligned at an angle θ to the axis 801. On the other hand, in scenario "B" (which is the true scenario), the fixing attaching the camera 101 to the vehicle 100 has become loosened and/or deformed, and therefore, although the vehicle is still aligned with the axis 801, the camera 101 is aligned at an angle θ to the axis 801.

The processor 203 therefore takes into account additional information, in this case, expected motion characteristics of the vehicle 100. These expected motion characteristics are stored in the storage medium 202, for example, and, in this case, include the fact that, when travelling on a straight portion of a tarmac circuit 301, it is expected that the vehicle will be substantially aligned along this straight portion (that is, with the axis 801 in FIG. 8). Based on this additional information, the processor thus determines that it is scenario "B" rather than scenario "A" which is correct. The processor 203 thus determines that the camera 101 is no longer positioned such that its field of view is that which is directly in front of the vehicle 100, and adjusts the position of the camera 101 relative to the position of the vehicle 100 accordingly. This ensures accurate continued tracking of the vehicle position.

It is noted that, when the vehicle 100 is determined by the processor 203 to be travelling along the straight portion of the tarmac surface 301, in the case that only a small number of images (that is, a number of images which is below a predetermined threshold number) are captured which imply that either the vehicle 100 or the camera 101 is not aligned with the axis 801 (the axis 801 being parallel to the straight portion of the tarmac surface 301), then the processor 203 may determine that it is the vehicle 100 (rather than just the camera 101) which is not aligned with the axis 801. On the other hand, in the case that a larger number of images (that is, a number of images which is above the predetermined threshold number) are captured which imply that either the vehicle 100 or the camera 101 is not aligned with the axis 801, then the processor 203 may determine that it is the camera 101 (rather than the vehicle 100) which is not aligned with the axis 801, and may thus adjust the position of the camera 101 relative to the position of the vehicle 100 accordingly. Such an arrangement ensures, for example, that an initial slide or slid of the vehicle on the track which is subsequently corrected (which would result in the vehicle 100 temporarily not being aligned with the axis 801) does not result in an adjustment of the position of the camera 101 relative to that of the vehicle 100.

In the above-mentioned embodiments, it is noted that the determined vehicle position comprises the position of a predetermined point (such as the centre of mass) of the vehicle on the track and the orientation of the vehicle in one or more dimensions. In the example of FIG. 8, prior to the determination of whether it is scenario "A" or scenario "B" which is occurring, the processor 203 knows the position of the predetermined point of the vehicle on the track (thus allowing the processor 203 to determine that the vehicle 100 is positioned on a straight portion of the tarmac circuit 301). The orientation of the vehicle is then determined by establishing whether or not it is scenario "A" or scenario "B" which is occurring.

The expected motion characteristics of the vehicle discussed with reference to FIG. 8 are an example of additional information which may be received by the input 201 of the apparatus 201. It will be appreciated that there are many examples of further additional information which may be used with the present technique in order to more accurately determine the position of vehicle on the track at any given time. Other examples of additional information include, for example, GNSS coordinates indicative of the position of the vehicle, other expected motion characteristics of the vehicle such as one or more of an expected trajectory, expected speed and expected acceleration (or deceleration) of the vehicle as the vehicle travels over a certain portion of the tarmac circuit of the track on the track, and timing loop information indicative of a time at which the vehicle is positioned at a predetermined position on the track (this predetermined position being a point on the tarmac circuit at which a timing loop is installed). Further examples of additional information include one or more of fuel load (for example, weight or volume of fuel), vehicle load (for example, the weight of the driver and any additional equipment carried by the vehicle) and tyre pressure information. Such information is often monitored using suitable computer systems in a racing vehicle, for example (such systems are known in the art). Parameters such as fuel load and vehicle load affect the weight of the vehicle and hence the acceleration (and deceleration). Parameters such as the tyre pressure also affect the motion characteristics of the vehicle in a variety of ways (for example, speed, acceleration (and deceleration), cornering ability, and the like).

Each of these types of additional information provide further information on the vehicle position and may be used, together with the above-mentioned embodiments, in accurately tracking the position of the vehicle. Such additional information is particularly useful, for example, when a previous position of the vehicle is unavailable (due to, for example, a failure of the image matching process or a temporary disruption of communication between the camera 101 and apparatus 200) and there are two or more potential positions of the vehicle (as occurs, for example, with the captured images 400B and 400C, as previously described) from which one must be selected. Another example of addition information is information output by an accelerometer (not shown) attached to the vehicle 100. This allows, for example, detection of acceleration, deceleration and/or cornering of the vehicle, which may be used in helping to determine the position on the track of the vehicle at a given time (thus, for example, if the information output by the accelerometer indicates that the vehicle is cornering left or right, then the processor 203 can determine that it is likely that the vehicle is located at a left or right hand bend (respectively) of the tarmac circuit 301, or if the information output by the accelerometer indicates that the vehicle is accelerating, then the processor 203 can determine that it is likely that the vehicle is either on a straight portion of the tarmac circuit 301 or is exiting a bend of the tarmac circuit 301). The use of an accelerometer (or gravitometer, for example) for vehicles such as motorcycles, for example, may be particularly effective, since cornering in such vehicles involves a significant amount of lean (that is, the vehicle leans either to the left (when cornering left) or right (when cornering right) rather than remaining vertically upright) which may detected by such a device and which can therefore give information about the likely current location of the vehicle on the track. It will be appreciated that these mentioned types of additional information are merely examples, and that other types of additional information which can be used with the above-mentioned embodiments in order to help determine the position of the vehicle more accurately may be used.

Figure 9:
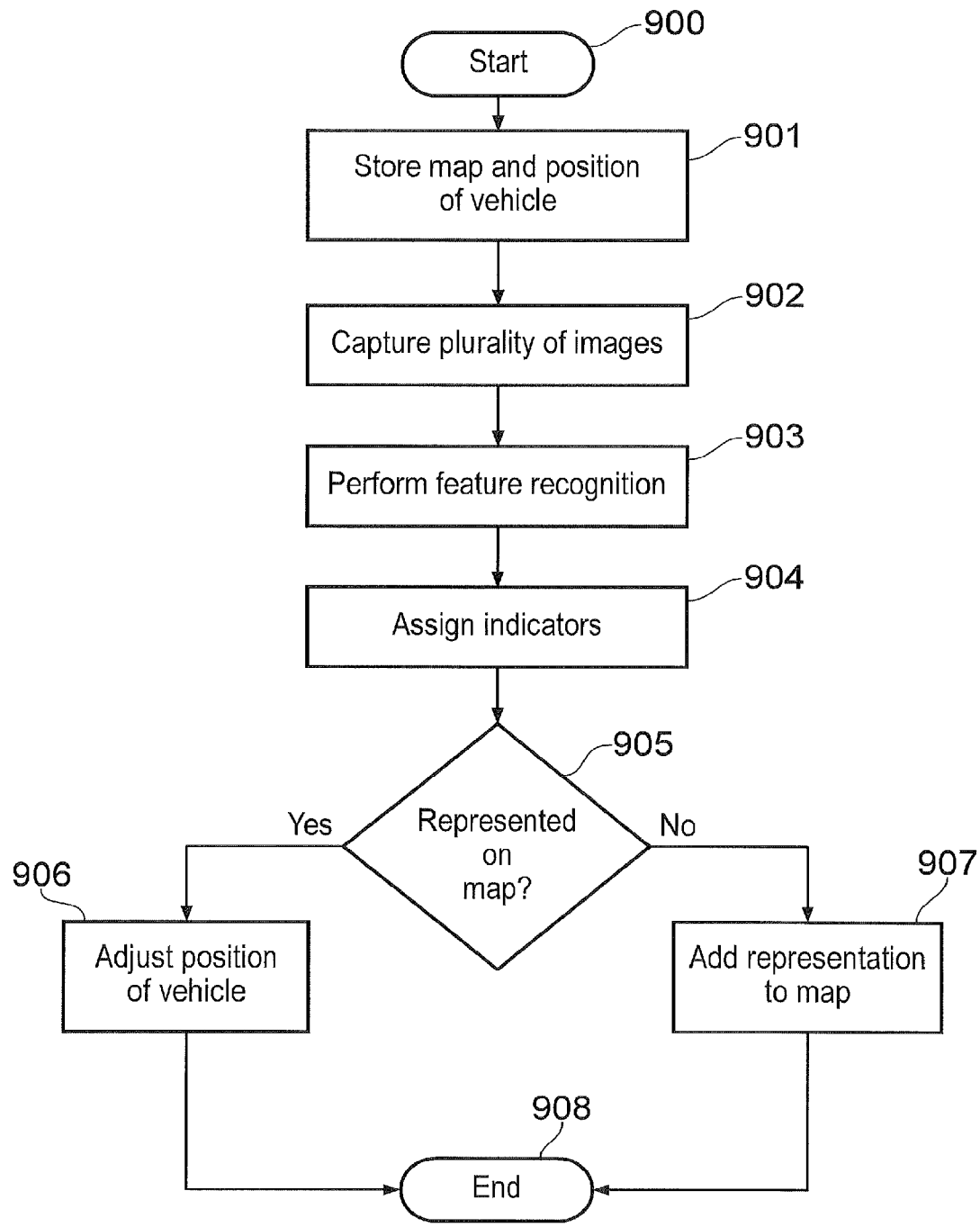
FIG. 9 shows a flow chart schematically illustrating a process according to an embodiment of the present disclosure.

FIG. 9 shows a flow chart schematically illustrating a process according to an embodiment of the present technique. The process is carried out by the processor 203 of the apparatus 200. The process starts at step 900. At step 901, a map of the track comprising a representation of one or more features of the track and a position of the vehicle on the map are stored in the storage medium 202. At step 902, a plurality of images captured by a camera attached to the vehicle as the vehicle travels along the track are received at the input 201. Steps 904 to 908 are then carried out for each of the plurality of images. At step 903, feature recognition is performed on the image. At step 904, an indicator is assigned to each recognised feature in the image. The indicator is indicative of the suitability of the recognised feature for adjusting the position of the vehicle on the map based on the recognised feature. For each recognised feature in the image with an indicator which indicates that the recognised feature is suitable for adjusting the position of the vehicle on the map based on the recognised feature, at step 905, it is determined whether the recognised feature is already represented in the map of the track. When the recognised feature is already represented in the map of the track, then the process proceeds to step 906, in which the position of the vehicle on the map is adjusted based on the position of the representation of the recognised feature in the map. On the other hand, when the recognised feature is not already represented in the map of the track, then the process proceeds to step 907, in which a representation of the recognised feature is added to the map. The process then ends at step 908.

It will be appreciated that, with the present technique, any suitable image recognition technique may be used in order to recognise image features in the images captured by the camera 101. An example suitable image recognition technique uses Canny edge detection. It will also be appreciated that any suitable SLAM technique may be used in order to determine the position of the vehicle on the track based on the captured images and the map of the track. An example suitable SLAM technique uses optical flow from a feature cloud.

Various embodiments of the present technique are defined by the following numbered clauses:

1. An apparatus for determining a position of a vehicle on a track, the apparatus comprising:

a storage medium operable to store a map of the track comprising a representation of one or more features of the track and to store a position of the vehicle on the map;

input circuitry operable to receive, from a camera attached to the vehicle, a plurality of images captured by the camera as the vehicle travels along the track; and processor circuitry operable, for at least one of the plurality of captured images:

to perform feature recognition on the image, to assign an indicator to at least one recognised feature in the image indicative of the suitability of the at least one recognised feature for adjusting the position of the vehicle on the map based on the recognised feature, and for each recognised feature in the image with an indicator which indicates that the recognised feature is suitable for adjusting the position of the vehicle on the map based on the recognised feature:

when the recognised feature is already represented in the map of the track, to adjust the position of the vehicle on the map based on the position of the representation of the recognised feature in the map, and when the recognised feature is not already represented in the map of the track, to add a representation of the recognised feature to the map.

2. An apparatus according to clause 1, wherein, when the recognised feature with an indicator which indicates that the recognised feature is suitable for adjusting the position of the vehicle on the map based on the recognised feature, is already represented in the map of the track, the representation of the recognised feature in the map of the track is adjusted based on the recognised feature.

3. An apparatus according to any preceding clause, wherein the indicator indicative of the suitability of the at least one recognised feature in the at least one of the plurality of images is determined based on a consistency of the appearance of the at least one recognised feature in two or more of the plurality of images, wherein a greater consistency in the appearance of the at least one recognised feature in the two or more of the plurality of images is associated with an indicator indicative of a greater suitability of the recognised feature for adjusting the position of the vehicle on the map based on the at least one recognised feature, and wherein a lesser consistency in the appearance of the at least one recognised feature in the two or more of the plurality of images is associated with an indicator indicative of a lesser suitability of the at least one recognised feature for adjusting the position of the vehicle on the map based on the at least one recognised feature.

4. An apparatus according to any preceding clause, comprising a storage medium configured to store a position of another vehicle on the track on the map; wherein the processor circuitry is operable to:

determine whether a recognised feature in the at least one of the plurality of captured images is the other vehicle on the track;

when it is determined that the recognised feature is the other vehicle on the track, adjust the position of the vehicle on the map based on the position of the other vehicle on the map.

5. An apparatus according to any preceding clause, wherein the processor circuitry is operable to:

determine whether a recognised feature in the at least one of the plurality of captured images is another vehicle on the track;

when it is determined that the recognised feature is the other vehicle on the track, determine the position of a representation of the other vehicle on the map based on the position of the other vehicle in the at least one captured image.

6. An apparatus according to clause 4 or 5, comprising a storage medium configured to store a position of each of a plurality of other vehicles on the track on the map; wherein the processor circuitry is operable to identify which of the plurality of other vehicles on the track is the other vehicle which is recognised as a feature in the at least one of the plurality of captured images based on the position of the vehicle on the map.

7. An apparatus according to any preceding clause, wherein the position of the vehicle on the map is further adjusted based on additional information to the stored map of the track.

8. An apparatus according to clause 7, wherein the additional information comprises global navigation satellite system (GNSS) coordinates indicative of the position of the vehicle.

9. An apparatus according to clause 7 or 8, wherein the additional information comprises timing loop information indicative of a time at which the vehicle is positioned at a predetermined position on the track.

10. An apparatus according to any one of clauses 7 to 9, wherein the additional information comprises information output by an accelerometer or gravitometer attached to the vehicle.

11. An apparatus according to any one of clauses 7 to 10, wherein the additional information comprises an expected motion characteristic of the vehicle over a predetermined portion of the track.

12. An apparatus according to any one of clauses 7 to 10, wherein the additional information comprises one or more of fuel load, vehicle load and tyre pressure information 13 An apparatus according to clause 11, wherein the processor circuitry is operable to:

adjust, based on a recognised feature in each of a predetermined number of the plurality of captured images captured as the vehicle travels over the predetermined portion of the track and the expected motion characteristic of the vehicle over the predetermined portion of the track, the position of the camera relative to the position of the vehicle; and adjust the position of the vehicle on the map based on the adjusted position of the camera relative to the position of the vehicle.

14. An apparatus according to any preceding clause, comprising output circuitry configured to output the adjusted position of the vehicle on the map to a display device for displaying an image representative of one or more features of the map and an image representative of the position of the vehicle on the map.

15. An apparatus according to clause 14, wherein the display device is one of a remote display device to which the images representative of one or more features of the map the position of the vehicle on the map are broadcast, a display device located at the track and a display device located within the vehicle.

16. A method of determining a position of a vehicle on a track, the method comprising:

storing a map of the track comprising a representation of one or more features of the track and storing a position of the vehicle on the map;

receiving, from a camera attached to the vehicle, a plurality of images captured by the camera as the vehicle travels along the track; and for at least one of the plurality of captured images:
performing feature recognition on the image,
assigning an indicator to at least one recognised feature in the image indicative of the suitability of the at least one recognised feature for adjusting the position of the vehicle on the map based on the recognised feature, and
for each recognised feature in the image with an indicator which indicates that the recognised feature is suitable for adjusting the position of the vehicle on the map based on the recognised feature:
when the recognised feature is already represented in the map of the track, adjusting the position of the vehicle on the map based on the position of the representation of the recognised feature in the map, and
when the recognised feature is not already represented in the map of the track, adding a representation of the recognised feature to the map.

17. A computer program product comprising a storage medium storing a computer program configured to control a computer to perform a method according to clause 16.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. An apparatus for determining a position of a vehicle on a track, the apparatus comprising:
a storage medium configured to store a map of the track comprising a representation of one or more features of the track and to store a position of the vehicle on the map;
input circuitry configured to receive, from a camera attached to the vehicle, a plurality of images captured by the camera as the vehicle travels along the track; and
processor circuitry configured to, for at least one of the plurality of captured images:
(i) perform feature recognition on the image,
(ii) assign an indicator to at least one recognised feature in the image indicative of a suitability of the at least one recognised feature for adjusting the position of the vehicle on the map based on the recognised feature, and
(iii) for each recognised feature in the image with the indicator which indicates that the recognised feature is suitable for adjusting the position of the vehicle on the map based on the recognised feature:
(a) when the recognised feature is already represented in the map of the track, adjust the position of the vehicle on the map based on the position of the representation of the recognised feature in the map, and
(b) when the recognised feature is not already represented in the map of the track, add a representation of the recognised feature to the map as the vehicle travels along the track.

2. The apparatus according to claim 1, wherein, when the recognised feature with the indicator which indicates that the recognised feature is suitable for adjusting the position of the vehicle on the map based on the recognised feature is already represented in the map of the track, the representation of the recognised feature in the map of the track is adjusted based on the recognised feature.

3. The apparatus according to claim 1, wherein the indicator indicative of the suitability of the at least one recognised feature in the at least one of the plurality of images is determined based on a consistency of an appearance of the at least one recognised feature in two or more of the plurality of images, wherein a greater consistency in the appearance of the at least one recognised feature in the two or more of the plurality of images is associated with an indicator indicative of a greater suitability of the recognised feature for adjusting the position of the vehicle on the map based on the at least one recognised feature, and wherein a lesser consistency in the appearance of the at least one recognised feature in the two or more of the plurality of images is associated with an indicator indicative of a lesser suitability of the at least one recognised feature for adjusting the position of the vehicle on the map based on the at least one recognised feature.

4. The apparatus according to claim 1, wherein
the storage medium is further configured to store a position of another vehicle on the track on the map,
the processor circuitry is further configured to:
determine whether a recognised feature in the at least one of the plurality of captured images is the other vehicle on the track;

when the recognised feature is determined as the other vehicle on the track, adjust the position of the vehicle on the map based on the position of the other vehicle on the map.

5. The apparatus according to claim 1, wherein the processor circuitry is configured to:
   determine whether a recognised feature in the at least one of the plurality of captured images is another vehicle on the track;
   when the recognised feature is determined as the other vehicle on the track, determine the position of a representation of the other vehicle on the map based on the position of the other vehicle in the at least one captured image.

6. The apparatus according to claim 4, wherein
   the storage medium is further configured to store a position of each of a plurality of other vehicles on the track on the map,
   the processor circuitry is operable to identify which of the plurality of other vehicles on the track is the other vehicle which is recognised as a feature in the at least one of the plurality of captured images based on the position of the vehicle on the map.

7. The apparatus according to claim 1, wherein the position of the vehicle on the map is further adjusted based on additional information to the stored map of the track.

8. The apparatus according to claim 7, wherein the additional information comprises global navigation satellite system (GNSS) coordinates indicative of the position of the vehicle.

9. The apparatus according to claim 7, wherein the additional information comprises timing loop information indicative of a time at which the vehicle is positioned at a predetermined position on the track.

10. The apparatus according to claim 7, wherein the additional information comprises information output by an accelerometer or gravitometer attached to the vehicle.

11. The apparatus according to claim 7, wherein the additional information comprises an expected motion characteristic of the vehicle over a predetermined portion of the track.

12. The apparatus according to claim 7, wherein the additional information comprises one or more of a fuel load, a vehicle load, and tire pressure information.

13. The apparatus according to claim 11, wherein the processor circuitry is configured to:
   adjust, based on a recognised feature in each of a predetermined number of the plurality of captured images captured as the vehicle travels over the predetermined portion of the track and the expected motion characteristic of the vehicle over the predetermined portion of the track, the position of the camera relative to the position of the vehicle; and
   adjust the position of the vehicle on the map based on the adjusted position of the camera relative to the position of the vehicle.

14. The apparatus according to claim 1, comprising output circuitry configured to output the adjusted position of the vehicle on the map to a display device for displaying an image representative of one or more features of the map and an image representative of the position of the vehicle on the map.

15. The apparatus according to claim 14, wherein the display device is one of (i) a remote display device to which the images representative of one or more features of the map the position of the vehicle on the map are broadcast, (ii) a display device located at the track, and (iii) a display device located within the vehicle.

16. A method of determining a position of a vehicle on a track, the method comprising:
   storing a map of the track comprising a representation of one or more features of the track and storing a position of the vehicle on the map;
   receiving, from a camera attached to the vehicle, a plurality of images captured by the camera as the vehicle travels along the track; and
   for at least one of the plurality of captured images:
      (i) performing feature recognition on the image,
      (ii) assigning an indicator to at least one recognised feature in the image indicative of a suitability of the at least one recognised feature for adjusting the position of the vehicle on the map based on the recognised feature, and
      (iii) for each recognised feature in the image with an indicator which indicates that the recognised feature is suitable for adjusting the position of the vehicle on the map based on the recognised feature:
         (a) when the recognised feature is already represented in the map of the track, adjusting the position of the vehicle on the map based on the position of the representation of the recognised feature in the map, and
         (b) when the recognised feature is not already represented in the map of the track, adding a representation of the recognised feature to the map as the vehicle travels along the track.

17. A non-transitory computer readable medium having instructions stored therein, which when executed by a processor causes the processor to execute comprising:
   storing a map of the track comprising a representation of one or more features of the track and storing a position of the vehicle on the map;
   receiving, from a camera attached to the vehicle, a plurality of images captured by the camera as the vehicle travels along the track; and
   for at least one of the plurality of captured images:
      (i) performing feature recognition on the image,
      (ii) assigning an indicator to at least one recognised feature in the image indicative of a suitability of the at least one recognised feature for adjusting the position of the vehicle on the map based on the recognised feature, and
      (iii) for each recognised feature in the image with an indicator which indicates that the recognised feature is suitable for adjusting the position of the vehicle on the map based on the recognised feature:
         (a) when the recognised feature is already represented in the map of the track, adjusting the position of the vehicle on the map based on the position of the representation of the recognised feature in the map, and
         (b) when the recognised feature is not already represented in the map of the track, adding a representation of the recognised feature to the map as the vehicle travels along the track.

* * * * *